United States Patent [19]
Herrick

[11] 4,152,899
[45] May 8, 1979

[54] THERMAL ENERGY STORAGE AND RELEASE UTILIZING COMBINED SENSIBLE HEAT AND LATENT HEAT OF FUSION

[75] Inventor: Carlyle S. Herrick, Alplaus, N.Y.

[73] Assignee: General Electric Company, Schenectady, N.Y.

[21] Appl. No.: 763,658

[22] Filed: Jan. 28, 1977

Related U.S. Application Data

[63] Continuation-in-part of Ser. No. 706,894, Jul. 19, 1976, abandoned.

[51] Int. Cl.² .............................................. B01D 9/02
[52] U.S. Cl. ...................................... 62/4; 23/302 T; 23/302 R; 122/21; 252/70; 252/71
[58] Field of Search ............... 62/4; 23/302 T, 302 R, 23/301 R; 423/551; 122/21; 252/70, 71

[56] References Cited

U.S. PATENT DOCUMENTS

| | | | |
|---|---|---|---|
| 2,677,243 | 5/1954 | Telkes | 62/4 |
| 2,677,664 | 5/1954 | Telkes | 252/70 |
| 2,827,438 | 3/1958 | Broadley et al. | 252/70 |
| 3,079,087 | 2/1963 | Herrick et al. | 237/1 |

FOREIGN PATENT DOCUMENTS 139484  1975  Japan.

OTHER PUBLICATIONS

A Dynamic Heat Storage System–Etherington, Heating, Piping & Air Conditioning, 12/57, pp. 147–151.
The Storage and Transfer of Low Potential Heat–Hodgins et al., Canadian Journal of Technology, 1955, vol. 33, p. 293.
Letter to the Editor, A. Whillier–The Sun at Work, vol. 2, p. 2, 6/57.
Solar Heat Storage–Telkes, ASME Paper, 64 WA-SO-L-9.

*Primary Examiner*—Hiram H. Bernstein
*Attorney, Agent, or Firm*—Leo I. MaLossi; Joseph T. Cohen; Charles T. Watts

[57] ABSTRACT

A method for the storage and retrieval of thermal energy is disclosed, which in a two phase, two component system is able to utilize both the sensible heat of water (always one of the components) and the heat of fusion of the second component (a salt which forms a hydrate). The system to be employed must be graphically definable in a phase diagram including a liquidus, the compositional range of the system being selected so as to lie within the compositional range of the liquidus along which the system is to operate during both the heating and cooling cycles.

4 Claims, 2 Drawing Figures

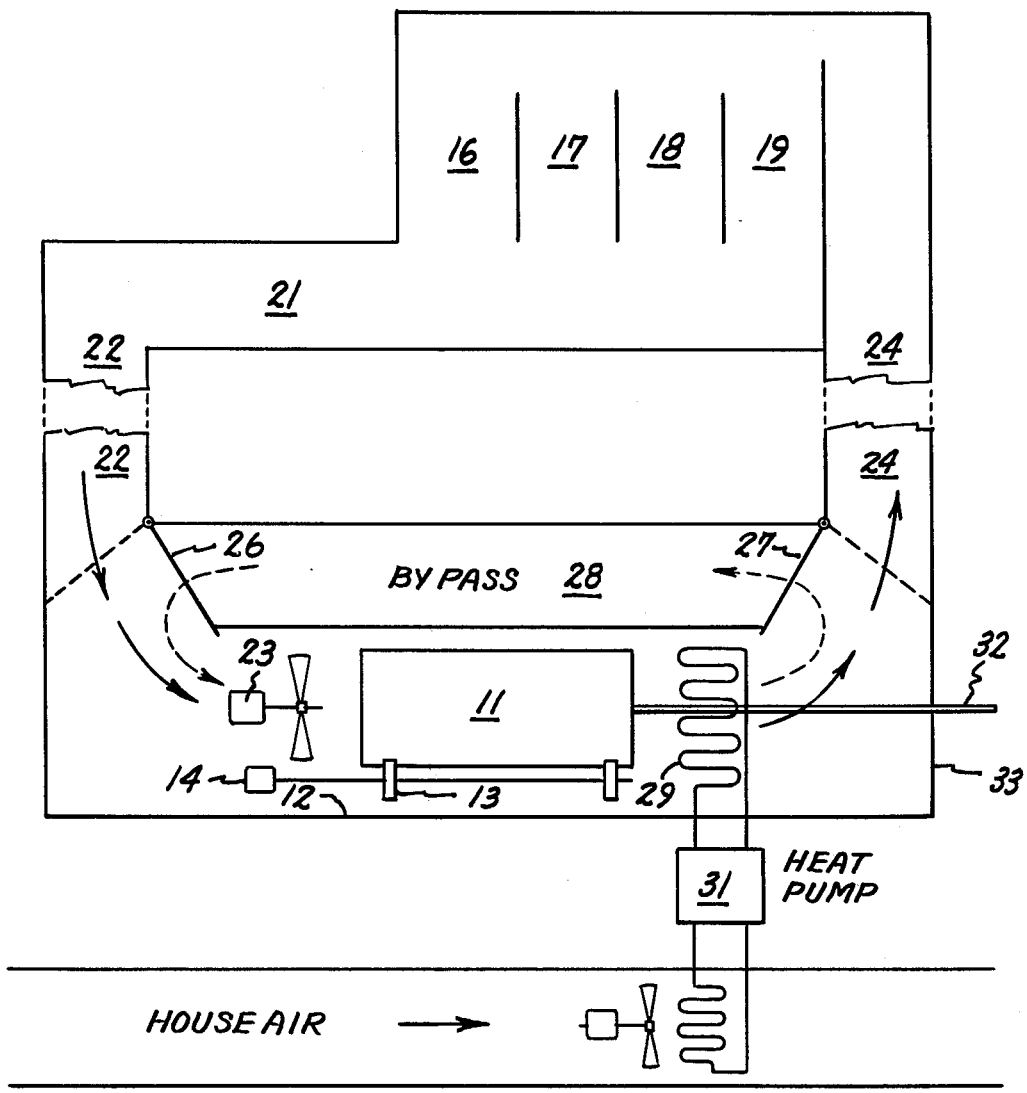

THERMAL ENERGY STORAGE AND RELEASE UTILIZING COMBINED SENSIBLE HEAT AND LATENT HEAT OF FUSION

BACKGROUND OF THE INVENTION

This is a continuation-in-part of U.S. patent application Ser. No. 706,894—Herrick filed July 19, 1976 (now abandoned) and assigned to the assignee of the instant application.

The present invention relates to a method of cyclically transferring heat to and removing heat from a thermal energy storage medium without degradation of the medium and consequent diminishment of the efficiency of the operation.

The need for energy storage is dictated by the fact that the demand for energy and the supply of energy both vary with time and generally this demand and supply are not synchronous. In the past century this lack of synchronization has been met by a reliance on fossil fuels. These fuels are becoming increasingly scarce and expensive and, as a result, intensive effort is being directed toward the development of alternate primary energy sources, such as solar energy. The effective utilization of solar energy requires the development of new mechanisms and processes for energy storage, since solar energy is by nature only intermittently available.

Various heat storage media have been proposed, e.g., crystalline hydrates of certain salts, which melt during absorption of heat and solidify during the removal of heat. The selection of a given heat storage medium will depend upon the temperature range over which heating and cooling occur. In some instances, rather than employ a medium which undergoes a phase transition it may be more desirable to heat and cool without undergoing any phase transition, e.g., heating or cooling a liquid or a solid through a selected temperature interval. This latter is termed "sensible" heat storage.

Where this invention requires changes in the composition (i.e., non-stoichiometric) as operation is conducted along the liquidus most prior art efforts, such as those described in U.S. Pat. No. 2,677,243—Telkes, U.S. Pat. No. 2,677,664—Telkes, U.S. Pat. No. 2,827,438—Broadley et al. and the Etherington article, "A Dynamic Heat Storage System" (ASHAE JOURNAL SECTION, Heating, Piping and Air Conditioning, Dec. 1957) are directed to the use of a stoichiometric (i.e., fixed) composition.

In the case of Japanese Patent Application No. 48-139484 published July 19, 1975 in the names of Narita et al., a non-stoichiometric composition is probably employed (i.e., the peritectic composition). However, no direction is given therein that the temperature cycling must be carried out with the system in equilibrium nor is any mention made of any intention to operate along the liquidus. Unless the system were to be deliberately maintained so that all of the solid phase formed is in equilibrium with the liquid phase, the temperature cycling would not occur along the liquidus as required in the invention set forth herein and the operation would occur in some manner other than that defined by the instant invention.

The method of the instant invention makes possible the simultaneous utilization in thermal energy storage and retrieval of the sensible heat of water and the heat of fusion of a salt, which forms a hydrate and which undergoes a phase transition.

DESCRIPTION OF THE INVENTION

A method for the storage and retrieval of thermal energy is disclosed, which in a two phase, two component system is able to utilize both the sensible heat of water (always one of the components) and the heat of fusion of the second component (a salt which forms a hydrate). The system to be employed must be graphically definable in a phase diagram including a liquidus, the range of composition of the system being selected so as to lie within the compositional range of the liquidus during the heating and cooling cycle. During operation, stirring is carried on to induce inter-particle motion to hydrate particles present in the system sufficient to maintain the system in equilibrium and thereby insure that the temperature cycling occurs along the liquidus.

BRIEF DESCRIPTION OF THE DRAWING

The subject matter of the instant invention for which protection is sought is presented as claims at the conclusion of the written description of the invention set forth herein. The description sets forth the manner and process of making and using the invention and the accompanying drawing forms part of the description for schematically illustrating the best mode. The view shown in FIG. 1 sets forth the pertinent parts of the sodium sulfate-water phase diagram and FIG. 2 schematically illustrates the functional relationship of apparatus for thermal energy storage utilizing the instant invention.

MANNER AND PROCESS OF MAKING AND USING THE INVENTION

Figure 1:
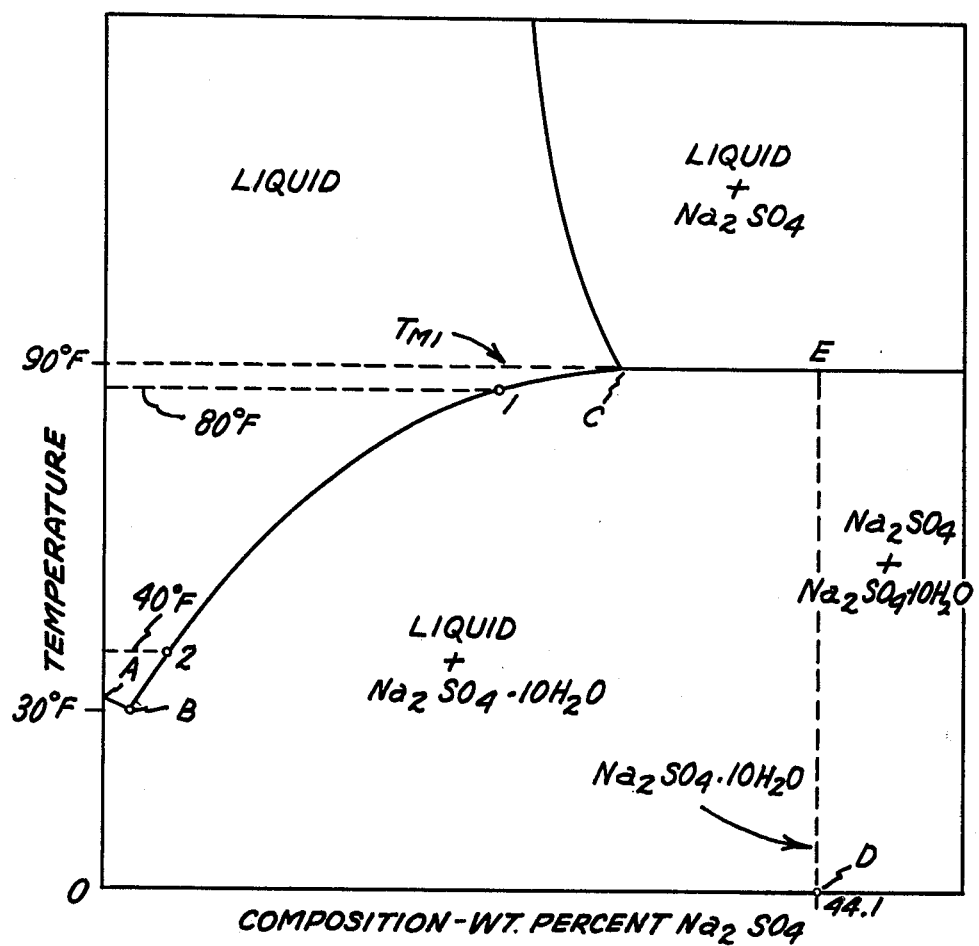

Understanding of this invention will be facilitated by defining certain terms of art utilized herein:

Phase Diagram

A graphic representation at constant pressure of the relationship between phases in equilibrium with each other in a system defined in terms of temperature and composition.

Liquidus

The locus of temperature-composition points representing the maximum solubility (saturation) of a solid phase in a liquid phase. In a binary system, it is a line. At temperatures above the liquidus, the system is completely liquid, and a point on the liquidus represents equilibrium between liquid and, in general, one crystalline phase.

System

Any portion of the material universe which can be isolated completely and arbitrarily from the rest for consideration of the changes which may occur within it under varying conditions. [In the instant invention a two phase (heterogeneous) system is employed.]

An exemplary phase diagram to illustrate the practice of the method of this invention is shown in FIG. 1. This is part of the $Na_2SO_4$ - water phase diagram. The line ABC represents the liquidus and this line defines for the $Na_2SO_4$-water system the temperature-composition operative limits for the application of this invention thereto. Similarly, in other water/salt systems, the operative temperature-composition parameters will be defined by the liquidus defined on the particular phase diagram for that given water-salt system. The line DE shows the stoichiometric composition of the incongruently melting compound $Na_2SO_4 \cdot 10H_2O$, which melts at $T_{M1}$. The various phases are set forth on the diagram.

Changes in temperature along the liquidus as by adding or removing heat from the system, when the system is in equilibrium, will change the composition of the liquid phase in the fixed relationship shown. The steeper the gradient of the liquidus, the greater the temperature differential that may be employed in the process. A compilation of phase diagrams from which appropriate systems may be selected is "Solubilities of Inorganic and Metal Organic Compounds"—A. Seidell and W. F. Linke, American Chemical Society, Washington, D.C., 1965. Some of the phase diagrams from this compilation are set forth in the report "Thermochemistry of Salt Hydrates"—N.T.I.S. P.B. 227966 (1973) on pages 71-79. Both sources of phase diagrams and information on salt hydrates are incorporated by reference.

By changing the particular salt hydrate employed some particular desired temperature interval and level may be selected for operation to match a storage system having a particular temperature interval requirement. Examples of temperature intervals for particular applications are as follows:

Air Conditioning . . . 40°-60° F.
Heat Pump (evaporator side) . . . 30°-70° F.
Residential Heating . . . 90°-150° F.
Heat Pump (condenser side) . . . 110°-150° F.

As noted above, a match for the particular temperature interval selected for operation must be available along the liquidus of the two component system (water plus a hydrate-forming salt) selected, preferably with the high point of the selected temperature interval falling close to the upper end of the liquidus line (e.g., close to point C shown for the $Na_2SO_4$-water system). Thus, considering the phase diagram in FIG. 1 as broadly representative of phase diagrams for systems for the practice of this invention, having matched the specific temperature interval (e.g., 40°-80° F.) desired with a given two component system (selected, for example, from the N.T.I.S. report), the system composition (a saturated solution of water and salt selected) is prepared such that at the upper end (i.e., 80° F.) of the temperature range the temperature/composition co-ordinates of the saturated solution fall on the liquidus at point 1. Thereafter, if the system is properly stirred during temperature cycling to maintain equilibrium, as heat is withdrawn from the system, the temperature of the system falls and the composition of the liquid phase becomes automatically adjusted along the liquidus as solid phase forms. In this way the lower end (i.e., 40° F.) of the selected interval is reached at a point (point 2) still on the liquidus. As heat is put back into the system the sequence described above occurs in reverse (the solid phase redissolves) and cycling in this manner can be carried on indefinitely.

If, on the contrary, insufficient inter-particle motion were to be induced by the stirring such that solid phase could settle out, this solid phase in segregating in this way would isolate part of the solid phase so that it could not have a solid/liquid interface. Such isolated solid phase would no longer be in equilibrium with the liquid phase and operation could no longer take place on the liquidus.

The method of this invention in the storing of thermal energy combines utilization of the sensible heat of water with the latent heat of fusion of the particular salt which forms a hydrate constituting the second component of the system.

EXAMPLE 1

In the temperature interval from 90° F. to 32° F. in the $Na_2SO_4$-water system, sodium sulfate decahydrate will crystallize out of a system of water saturated with sodium sulfate as the temperature falls. The heat of fusion of the hydrate is substantial. For example, over the temperature interval 60° F.-32° F. enough hydrate crystallizes so that the heat of fusion evolved is of a magnitude comparable to the sensible heat evolved from the water component. In this temperature range the ratio of total heat evolved to the sensible heat evolved from the water alone is calculated as 1.95. Thus, 1.95 BTU/lb is obtained by lowering the solution temperature 1° F. along the liquidus, a value almost double the sensible heat obtainable from water for this same temperature differential.

EXAMPLE 2

In a $Na_3PO_4$-water system, in removing heat along the liquidus over the temperature differential 158° F. to 110° F., water saturated with the anhydrous salt will crystallize out enough trisodium phosphate dodecahydrate so that the summation of the heat of fusion from the salt hydrate added to the sensible heat of water will provide a total heat effect estimated to be 2.2 times the sensible heat of water.

Thus, in the practice of this invention a greatly augmented thermal storage density for water can be obtained, because of the approximate doubling of the effective heat capacity thereof (e.g., a storage density of about 4500/BTU/cu. ft. over a 30° range may be obtained). Such an energy storage density in a relatively inexpensive system compares very favorably with the utilization of such heat of fusion materials as paraffins and waxes.

By maintaining the system in equilibrium by stirring and operating along the liquidus with sequential melting and freezing, the cycles are completely reproducible without loss of salt from the system as would otherwise occur, if any portion thereof were to fail to be available for re-dissolution in the liquid. As a result even water-salt systems in which incongruently melting hydrates (e.g., sodium sulfate decahydrate) are encountered may be employed, because operation in accordance with the method of this invention avoids the incongruent portion of the phase diagram. In systems in which operation is conducted over a sufficiently wide temperature range, extensive supercooling will cause thermal nucleation without creating problems in the system. If the application is one in which one wishes to avoid supercooling other provision must be made for nucleation as is described hereinbelow.

An example of a thermostorage system in which the method of the instant invention may be practiced is set forth in FIG. 2. Having selected an appropriate system comprising water and a hydrate-forming salt, which system has a liquidus providing operation in the desired temperature range, a volume of water saturated with the salt is enclosed in cylinder 11 disposed in air passage 12 and mounted on means 13 driven by motor 14 for slowly rotating cylinder 11 about its axis. The rotation induces inter-particle motion of any hydrate crystals forming in the cycling operation. This device is described in greater detail in pending U.S. application Ser. No. 706,875—Herrick, filed July 19, 1976, and assigned to the assignee of the instant invention. The aforementioned application is incorporated by reference. Air heated in the solar collectors 16, 17, 18, 19 is moved through ducts 21, 22 to conduit 12 by the driving force of fan 23. As the heated air passes over cylinder 11, the content thereof is raised in temperature melting the hydrate therein. In this manner thermal energy from the solar collectors (e.g., mounted on the roof of a residence) is stored in cylinder 11 (e.g., in the basement of the residence) for later removal therefrom. The air stream, after releasing its heat to the wall of cylinder 11 is returned to the solar collectors via duct 24 for reheating.

When enough heat has been transferred to the saturated water in the cylinder 11 for the temperature thereof to reach the upper end of the preselected temperature range, sensors (not shown) actuate damper valves 26, 27 to the positions shown by dotted lines to place air passage 12 into flow communication with bypass conduit 28 and simultaneously close off the heating ducts 22, 24. Thereafter, the thermal energy stored in cylinder 11 can be removed by continuing air circulation thereover and cooling the air by means of the expansion coils 29 for heat pump 31 whereby the heat received in air passage 12 is transferred to various rooms in the residence. The slow rotation of cylinder 11 stirs the contents, promotes uniform internal temperatures and maintains the inner surface thereof clean by separating the solidifying phase change material therefrom. This latter provides an efficient heat exchange surface during the cooling cycle.

The result of this stirring action is that the settling and caking of solid phase is obviated. Such settling and caking, if permitted to occur, would segregate solid phase such that a portion of this solid phase would not be at the solid/liquid interface and, then, would not be in equilibrium with the liquid phase.

Long term reliable nucleation capability is provided by hollow tube 32. This tube is a receptacle for providing the permanent availability of solid (crystalline) material capable of initiating the formation of crystals in the contents of cylinder 11. Tube 32 is closed at the distal end thereof and the interior of this tube is in flow communication with the interior of enclosure 11. Usually, the nucleating material will be crystals of the salt hydrate formed by the second component and these crystals remain in contact with the liquid system. When crystallization should occur, crystal growth will proceed along the length of tube 32 and enter enclosure 11 for the initiation of nucleation therein. The distal end of tube 32 penetrates insulated wall 33 into a region in which the temperature is at a point below the maximum temperature of operation.

When the composition (water plus a salt which forms a hydrate) in cylinder 11 has been cooled to the lower end of the preselected temperature range (if heat is available at the solar collectors), the damper valves 26, 27 are reset to shut off the bypass and the heating resumes.

The structure disclosed for conduct of the method of this invention is exemplary. Stationary tanks (in which adequate internal stirring is possible) may, of course, be employed. A heat exchanger can be employed disposed either inside or outside of the tank.

BEST MODE CONTEMPLATED

The best mode to be selected depends upon the given application being considered. Thus, the best mode for heating a residence would employ the arrangement as generally shown in FIG. 2; namely, solar collectors, rolling cylinder (with nucleator tube) having a volume of about 1000 gallons and a heat pump. This volume of water saturated with $Na_2SO_4$ will provide about 1 million BTU of storage. Rotation of the cylinder will be at about 1 rpm and operation would be over the 90° F.–35° F. range.

What I claim as new and desire to secure by Letters Patent of the United States is:

1. The method for storing and releasing thermal energy comprising the steps of:

employing as the medium into which thermal energy is to be absorbed and from which said thermal energy is to be removed a two phase, two component system having a phase diagram including a liquidus, the phases employed being liquid and solid and one of said components being water with the second component being a hydrate-forming salt;

adjusting the amounts of the two components and the temperatures of the resulting medium such that said medium is a saturated aqueous solution having initial temperature-composition values coinciding with a first temperature-composition point on said liquidus;

removing thermal energy from said medium to reduce the temperature thereof and simultaneously nucleating the formation of hydrate crystals of the second component at substantially said first temperature-composition point after which as the removal of thermal energy continues hydrate crystals continue to form and the temperature-composition values of said medium change proceeding along said liquidus to some predetermined temperature-composition point at a lower temperature than the temperature of said first temperature-composition point;

heating said medium to increase the temperature thereof to redissolve said hydrate and cause said medium to approach said initial temperature-composition along said liquidus;

repeating the temperature cycling of the previous steps whereby the sensible heat of water and the heat of fusion of said hydrate-forming salt are simultaneously employed in the thermal energy storage and retrieval; and stirring said medium during said temperature cycling to induce inter-particle motion to hydrate crystals present therein sufficient to maintain said medium in equilibrium whereby said temperature cycling occurs substantially only along said liquidus.

2. The method recited in claim 1 where the hydrate-forming salt is $Na_2SO_4$.

3. The method recited in claim 2 wherein the cycling is accomplished over the range of from about 90° F. to about 35° F.

4. The method recited in claim 1 wherein the hydrate-forming salt is $Na_3PO_4$.

* * * * *